United States Patent [19]

Mariano et al.

[11] Patent Number: 5,498,645
[45] Date of Patent: Mar. 12, 1996

[54] MODELING DOUGH

[75] Inventors: Karen M. Mariano; Thomas Kauffman, both of Easton; Stacey A. Gregor, Allentown

[73] Assignee: Binney & Smith Inc., Easton, Pa.

[21] Appl. No.: 320,880

[22] Filed: Oct. 11, 1994

Related U.S. Application Data

[63] Continuation-in-part of Ser. No. 990,599, Dec. 14, 1992, Pat. No. 5,364,892, which is a continuation-in-part of Ser. No. 734,951, Jul. 24, 1991, Pat. No. 5,171,766.

[51] Int. Cl.$^6$ .............................. C08K 3/26; C08K 3/34; C08K 5/01; C08L 29/04
[52] U.S. Cl. .............. 523/218; 524/427; 524/446; 524/447; 524/449; 524/451; 524/557; 524/276; 524/475
[58] Field of Search ...................... 523/216, 219; 524/427, 447, 446, 497, 451, 492, 493, 503, 556, 557, 275, 276, 277, 487, 488, 489

[56] References Cited

U.S. PATENT DOCUMENTS

| | | | |
|---|---|---|---|
| 3,061,572 | 10/1962 | Packer | 524/526 |
| 3,135,648 | 6/1964 | Hawkins | 524/425 |
| 3,143,518 | 8/1964 | Smith | 524/388 |
| 3,167,440 | 1/1965 | McVicker et al. | 106/150 |
| 3,213,051 | 10/1965 | Pink | 524/215 |
| 3,353,981 | 11/1967 | Jacob | 428/248 |
| 3,558,340 | 1/1971 | Spector | 427/201 |
| 3,607,332 | 9/1971 | Wingfield | 106/243 |
| 3,632,786 | 1/1972 | Nickerson | 524/387 |
| 3,714,086 | 1/1973 | Schaefer et al. | 524/557 |
| 3,784,391 | 1/1974 | Kruse et al. | 524/389 |
| 3,853,797 | 12/1974 | Pelzig | 524/48 |
| 3,873,485 | 3/1975 | Ficher | 524/612 |
| 3,886,112 | 5/1975 | Watson et al. | 524/557 |
| 3,959,197 | 5/1976 | Salyer et al. | 521/54 |
| 3,961,967 | 6/1976 | Brooks | 106/37 |
| 4,005,033 | 1/1977 | Georgeau et al. | 521/59 |
| 4,076,547 | 2/1978 | Lester et al. | 106/779 |
| 4,094,694 | 6/1978 | Long | 524/557 |
| 4,095,008 | 6/1978 | Sundstrom et al. | 428/218 |
| 4,172,054 | 10/1979 | Ogawa et al. | 524/47 |
| 4,303,603 | 12/1981 | Torobin | 264/69 |
| 4,336,071 | 6/1982 | Schnorrer | 524/297 |
| 4,350,723 | 9/1982 | Sugimura et al. | 524/501 |
| 4,386,964 | 6/1983 | Herbert | 106/156 |
| 4,442,252 | 4/1984 | Sumi et al. | 524/183 |
| 4,469,837 | 9/1984 | Cattaneo | 524/557 |
| 4,731,389 | 3/1988 | Christopher et al. | 521/103 |
| 4,956,404 | 9/1990 | Pelzig | 524/48 |
| 4,980,005 | 12/1990 | Scollard | 428/120 |
| 5,157,063 | 10/1992 | Wetherell | 524/55 |
| 5,395,873 | 3/1995 | Mizoule | 524/388 |

FOREIGN PATENT DOCUMENTS

| | | |
|---|---|---|
| 0075934 | 9/1982 | European Pat. Off. . |
| 504016 | 9/1992 | European Pat. Off. . |
| 3115746 | 12/1982 | Germany . |
| 3238232 | 4/1984 | Germany . |
| 3641761 | 6/1988 | Germany . |
| 1041748 | 10/1974 | Japan . |
| 51-041748 | 4/1976 | Japan . |
| 51-125446 | 11/1976 | Japan . |
| 4154411 | 5/1978 | Japan . |
| 54-154411 | 12/1979 | Japan . |
| 55-052086 | 4/1980 | Japan . |
| 59-036278 | 2/1984 | Japan . |
| 1060636A | 7/1981 | U.S.S.R. . |
| 2214186 | 8/1989 | United Kingdom . |

OTHER PUBLICATIONS

DUALITE (resin compound), Material Safety Data Sheet, by Pierce & Stevens, Buffalo, New York 14240–9990 (May, 1994).

DUALITE® Microspheres, Technical Data Package by Pierce & Stevens Corp., Buffalo, New York 14240–9990 (Feb., 1992).

DUALITE Hollow Composite Microsphere Fillers, Brochure by Pierce & Stevens, Corp., Buffalo, New York 14240–9990 (Jun., 1989).

DUALITE, Your Best Choice in Lightweight Fillers Because It Combines All These Properties, Brochure by Pierce & Stevens Corp., a Pratt & Lambert Company, Buffalo, New York 14240–1092.

Shibayama, M. et al., "Sol-gel transition of poly(vinyl alcohol)-borate complex", Nov. 1988, Polymer, vol. 29, pp. 2066–2071.

Shibayama, M. et al., "B n.m.r. study on the reaction of poly(vinyl alcohol) with boric acid", Feb. 1988, Polymer, vol. 29, pp. 336–340.

Ochiai, H. et al., "Mechanical and Thermal Properties of Poly(vinyl alcohol) Crosslinked by Borax", 1976, Polymer Journal, vol. 8, No. 1, pp. 131–133.

Cheng, A. et al., "Mechanical Properties of Borate Crosslinked Poly(vinyl Alcohol) Gels", 1981, Journal of Applied Polymer Science, vol. 26, pp. 3895–3908.

Ochiai, H. et al., "Polyelectrolyte Behavior of Poly(vinyl alcohol) in Aqueous Borax Solutions", 1982, Polymer Journal, vol. 14, No. 5, pp. 423–426.

Ochiai, H. et al. "Complex formation between poly(vinyl alcohol) and borate ion", Nov. 1981, Polymer, vol. 22, pp. 1456–1458.

*Primary Examiner*—Peter A. Szekely
*Attorney, Agent, or Firm*—Leydig, Voit & Mayer, Ltd.

[57] ABSTRACT

A modeling dough comprising a polar polymeric resin, water, a gellant, and a filler provides a dough resistant to flaking, cracking, and crumbling. In the disclosed invention, the polymeric resin is gelled, thereby providing a water-based resin system that is not sticky yet very ductile. After the dough is air-dried, the components are bound into a solid, durable product. The filler accounts for a large portion of the volume of the dough, so the overall volume is not greatly affected by water loss upon drying. The dough is water-based and easy to wash from skin, carpets, and other surfaces. Dyes and pigments can be easily incorporated into the formula. The dried product is sandable and paintable.

16 Claims, No Drawings

MODELING DOUGH

This is a continuation-in-part of U.S. patent application Ser. No. 07/990,599, filed Dec. 14, 1992, which issued as U.S. Pat. No. 5,364,892 on Nov. 15, 1994, which application in turn was a continuation-in-part of U.S. patent application Ser. No. 07/734,951, filed Jul. 24, 1991, which issued as U.S. Pat. No. 5,171,766 on Dec. 15, 1992.

TECHNICAL FIELD OF THE INVENTION

The present invention relates to an improved water-based modeling dough for use by children and artists in general. Specifically, the present invention relates to an improved water-based modeling dough having a gelled polymeric resin and a filler which operate together to form a matrix. The present invention provides an improved water-based modeling dough which forms a solid, lightweight, durable product upon drying.

BACKGROUND OF THE INVENTION

The present invention does not relate to oil-based clays comprising naturally occurring clays that are mined as rocks. Rather, the present invention relates to manmade, water-based modeling doughs.

Non oil-based modeling doughs are normally air-dryable and incorporate starch as the filler. These doughs have a tendency to flake, crack, and crumble in both the wet and dry stages. These doughs also shrink substantially upon drying. In other words, these doughs are characterized by poor plasticity, poor dry strength and substantial drying shrinkage.

Plasticity is the property of a wet dough or clay that permits deformation by application of a relatively slight pressure and retention of the deformed shape after release of the pressure. This property distinguishes the dough in its wet stage from its dry stage. When wet, starch-based modeling doughs have a low plasticity and have a tendency to break apart during the molding or manipulating process. These doughs also have a tendency to crack when dry and are not easily shaped in the dry state by sanding or filing. Furthermore, the artist cannot easily add wet dough to the existing dried sculpture. Finally, artists cannot carve dried starch-based doughs.

Another problem inherent with water-based doughs is the loss of volume (shrinkage) upon drying. Because water accounts for a large portion of the volume of the dough in its wet stage, water loss upon drying results in a loss of volume in the resulting molded product.

One attempt to overcome the shrinkage problem has been to incorporate large proportions of filler in the dough mixture, but shrinkage still occurs because the volume of the dough decreases as the filler binds together after drying. One commercially available children's dough, for example, shrinks about 20% upon drying despite its high filler content. In other words, a sculpture made with that dough can lose about 20% of its total volume upon drying. Moreover, the use of large proportions of filler aggravates the flaking, cracking and crumbling problem discussed above, and also tends to decrease the dry strength of the molded sculpture.

Discoloration upon drying is another problem associated with water-based doughs and is compounded by the dry shrinkage discussed above. As the volume decreases, the concentration of the pigment increases and the color darkens.

Yet another problem associated with conventional water-based doughs is that they are heavy and hard to manipulate. Dense, heavy doughs are awkward and the child or artist is limited in the types of shapes that can be created without the dough falling apart.

Finally, currently available water-based doughs generally are destructive to textiles, carpeting, furniture and other surfaces. They tend to stain a surface and are not easily removed by washing.

In light of the above problems, the need arises for a water-based, air-drying dough that is easily washed from textiles, carpeting and other surfaces. Furthermore, the water-based, air-drying dough should be able to incorporate colorants such as dyes and pigments and not discolor upon drying.

Accordingly, it is a general object of the present invention to provide a water-based modeling dough that overcomes the drawbacks associated with previously known modeling doughs.

BRIEF SUMMARY OF THE INVENTION

The present invention overcomes the drawbacks inherent in known modeling doughs by providing a modeling dough comprising a polar polymeric resin component, water, a gellant, and a filler to form a cohesive polar resin system. The water evaporates to leave a gelled resin-filler matrix that is both lightweight and durable.

In one preferred form, the composition of the invention includes from about 4% to about 15% total polymeric resin, from about 0.05% to about 2% gellant, from about 40% to about 60% water and from about 0.5% to about 30% filler. Optionally, the composition of the invention may include one or more of a buffering agent, a defoamer, a wetting agent, a humectant, a preservative, a colorant and a fragrance.

DESCRIPTION OF THE PREFERRED EMBODIMENTS

To achieve the foregoing and other objects in accordance with the purposes of the present invention, as embodied and broadly claimed herein, the modeling dough disclosed in the present invention comprises from about 40% to about 60% water, from about 4% to about 15% total polymeric resin, from about 0.5% to about 30% filler and from about 0.05% to about 2% gellant. A preferred formulation of the dough of the present invention comprises from about 43% to 49% water, from about 10% to about 14% total polymeric resin, from about 24% to about 26% filler, from about 0.05% to about 0.2% gellant; from about 1% to about 2% defoamer; from about 0% to about 2% wetting agent; from about 0% to about 1% buffering agent; from about 5% to about 15% humectant; from about 0.5% to about 1% fragrance; from about 0% to about 5% colorant; and from about 0.15% to about 75% preservative. Percentages expressed in this application are expressed as percentages by weight unless otherwise indicated.

The polymeric resin binds with the filler upon drying, thereby avoiding the flaking, cracking and crumbling problems associated with prior compositions. The polymeric resin gives the dough its ductility and plasticity qualities while wet.

However, employing a polymeric resin can result in a dough that is sticky and hard to manipulate. Therefore, a gellant, such as a water soluble borate salt, in an amount of from about 0.05 % to about 2% by weight, should be used to gel the resin substantially, eliminate stickiness, and impart wet ductility to the resulting dough. Preferably, the gellant is used in compositions of the invention in an amount of from about 0.05% to about 0.20% by weight.

Most water soluble borate salts are acceptable. Sodium tetraborate is the preferred gellant, however, because it also acts as a buffer to maintain the pH of the system at a level high enough to permit gelling of the polymeric resin. Other workable gellants include, but are not limited to gellants such as resorcinol, catechol, gallic acid, 2-4-dihydroxy benzoic acid and congo red dye.

A variety of polar polymeric resins are useful in the modeling doughs of the present invention. Polymeric resins suitable for use in the modeling doughs of the present invention include, for example, water-soluble resins such as poly(vinyl alcohol), alginate resins, polysaccharide gums, cellulose gums, starches, guars, agars, gum arabic, acrylic acid, Gellan gum, CARBOPOL resins, polyvinylpyrrolidone resins, and copolymers of vinyl acetate and methacrylates or acrylates which are then subsequently fully hydrolyzed to yield copolymers of vinyl alcohol and methacrylic or acrylic acid. Examples of the latter resins include ELVANOL 93-01, ELVANOL 75-15, and ELVANOL 85-82. All of these resins are watersoluble either with or without agitation. In general, polymeric resins containing polar groups, such as alcohol, ether, ester, amide, amine, or siloxane groups, may be used as resins in the modeling doughs of the present invention. Non-water-soluble resins containing polar groups may be used.

Poly(vinyl alcohol), as used in the present application, is a cream-colored powder which is soluble in water and insoluble in most organic solvents. It is made by the hydrolysis of poly(vinyl acetate) and, when commercially purchased, may be partially or fully hydrolyzed. It varies in molecular weight according to the length of the resin chain. Both the degree of hydrolyzation and molecular weight independently affect the thermal stability of the dough. Partially hydrolyzed (88 percent), medium weight (85,000–146,000) polyvinyl alcohols have proved useful. Molecular weights in this application are defined as weight-average molecular weights except where otherwise indicated. Among the useful polymeric resins are those sold under the tradenames AIRVOL 523 and AIRVOL WS42 by Air Products & Chemicals, Inc. and ELVANOL 52–22 by E.I. du Pont de Nemours and Company.

Newly discovered is that poly (vinyl alcohols) having a lower level of hydrolysis also are suitable for use in the modeling doughs of the present invention. For example, poly(vinyl alcohols) having a level of hydrolysis of from about 40% to about 88% by weight are suitable for use in the modeling doughs of the present invention. These poly(vinyl alcohols) are less brittle than those having a higher level of hydrolysis; thus, a smaller amount of glycerin or other plasticizing agent may be used to soften the mixture to a usable texture. Examples of such poly(vinyl alcohol) resins include GOHSERAN L-0301 and L-0302, from Nippon Goshei, Ltd., Osaka, Japan, and SP-202W and SP-404W from 3V, Inc., Charlotte, N.C. The listed GOHSERAN resins are hydrolyzed to 50 mol percent max, whereas SP-202W and SP-404W are hydrolyzed to 47 and 55 mol percent respectively. These resins may be used in addition to, or in place of, poly(vinyl alcohol) in the modeling doughs of the present invention.

Another specialized class of polyvinyl alcohols are ELVANOL 93-01, ELVANOL 75-15, and ELVANOL 85-82, available from E.I. du Pont de Nemours and Company. These resins are derived from a copolymer of vinyl acetate and an acrylate or methacrylate comonomer. The acrylate or methacrylate comonomer is believed to be present in an amount from about 5 wt. percent to about 50 wt. percent. These resins are fully hydrolyzed to yield copolymers comprising vinyl alcohol groups and methacrylic acid or acrylic acid groups. The acid groups can then further react to form internal esters (lactones).

It is believed that these resins are more internally plasticized than are conventional poly(vinyl alcohol) resins. In addition, these grades of ELVANOL also are more stable at high pH than are standard polyvinyl alcohols. Of these grades, ELVANOL 93-01 is the most preferred. These resins may be used in addition to, or in place of, poly(vinyl alcohol) in the modeling doughs of the present invention. Preferably, a small amount of a conventional poly(vinyl alcohol), such as AIRVOL 125, is used with the ELVANOL to tailor the rigidity of the modeling dough.

Examples of polysaccharide gums suitable for use as polymeric resins in the modeling doughs of the present invention include Gellan gum, KELSET, KELTOSE, KELZAN, and KELCOGEL, available from Kelco division of Merck, Inc., San Diego, Calif. Suitable cellulose gums include, for example, carboxymethylcellulose gums, such as AQUALON cellulose gum, available from AQUALON Co., Wilmington, Del., and hydroxyethylcellulose gums, such as that sold under the trademark CELLOCIZE QP40, available from Union Carbide Chemicals & Plastics Co., Inc., Danbury, Conn. These resins may be used in conjunction with poly(vinyl alcohol) in the modeling doughs of the present invention, or may alternatively replace poly(vinyl alcohol).

Suitable polyvinylpyrrolidones include PVP K-15 and K-60, available from GAF Chemicals Corp., Wayne, N.J. Another suitable class of resins are the CARBOPOL resins available from B.F. Goodrich Co., Cleveland, Ohio. CARBOPOL resins are crosslinked copolymers of acrylic acid. For example, CARBOPOL 961 may be used in the modeling dough of the present invention. These resins may be used in conjunction with poly(vinyl alcohol) in the modeling doughs of the present invention or, alternatively may replace poly(vinyl alcohol) altogether. In addition, CARBOPOL resins allow for pH-sensitive thickening of the modeling dough. As the pH of the dough is increased over a range of about 7½ to about 9, the acrylic acid in the polymeric resin is neutralized, and becomes ionic. This will result in a stiffer, less tacky modeling dough.

In addition, a number of other suitable materials have been found suitable for use in the modeling doughs of the present invention in conjunction with poly(vinyl alcohol). For example, starches, such as wheat, corn, and potato starch may be used. In addition, other plant sources, such as guar, agars, and gum arabic may be used. Examples of such materials include SUPERCOL guar gum, available from Aqualon Co., Wilmington, Del., and AMAIZO 710 corn starch, available from American Maize Products Co., Hammond, Ind.

Further, non-water-soluble resins, such as silicone polymers, may be used with poly(vinyl alcohol) as the polar resin in the modeling doughs of the present invention. An example of such a silicone polymer is DOW CORNING Q2-3233.

The polymeric resin is preferably present in compositions of the invention in an amount of from about 4% to about 15% by weight of the composition. The polymeric resin is more preferably present in compositions of the invention in an amount of from about 10% to about 14% by weight of the composition.

If bounceability of the dough is a requisite feature of the product, then a lower molecular weight, partially hydrolyzed polymeric resin such as Airvol 203 or Airvol 205 should be used. This resin grade also produces doughs that are especially resistant to cracking. However, doughs made with this resin grade have reduced thermal stability and will have a shorter shelf-life. The average molecular weights of Airvol 203 and Airvol 205 are each about 31,000–50,000. Alternatively, polyvinyl alcohols with lower levels of hydrolysis or copolymers of vinyl alcohol and methacrylic acid or acrylic acid can be used to achieve bounceability.

Dry shrinkage is another problem inherent in water-based doughs disclosed in the prior art and overcome by the present invention. The present invention overcomes this problem by incorporating a filler that bonds with the gelled polymeric resin to form an adequate matrix. The water evaporates upon drying without substantial shrinkage to the sculpture or other molded object. Workable fillers, included in the amount of 10 to 30 weight percent, include, for example, hollow composite microspheres, inert talc, calcium carbonate, mica, clay or ceramic particles and combinations thereof. Most preferred in compositions of the invention is a concentration of filler in an amount of from about 24% to about 26% by weight.

Hollow composite microspheres are the preferred filler primarily because of the low cost. They are functionally desirable because they are lightweight (having density of about 0.13 g/cc) and lower the density of the modeling dough.

The hollow composite microsphere filler incorporated in the modeling dough disclosed by the present invention is especially helpful in preventing the molded object or sculpture from shrinking upon drying. While the weight percent of water in the present invention can be high (40% to 60%), the actual partial volume of water is relatively low due to the relatively high density of water (1.0 g/cc) and low density of the microspheres. An even more preferred range of water content in compositions of the inventions is from about 43% to about 49% by weight.

As a result of these relative weights, the hollow microspheres constitute the majority of the volume of the dough. The polymeric resin and the microspheres bind together to give a sufficient structural integrity for molding. Thus, when the water evaporates, the dough does not lose a large percentage of its total volume.

The preferred filler consists essentially of hollow composite microspheres of about 50 micron diameter and having a wettable particulate coating. Microspheres with a larger diameter, such as up to about 150 microns, are workable, but may give the dough a grainy texture. This may be desired for certain applications. Microspheres with a smaller diameter may result in a heavier dough but result in a smoother texture. Thus, the choice of a particular size is determined by the desired end properties.

The microsphere coating facilitates the wetting of the microspheres by the liquid ingredients of the dough. The coating also contributes to the smooth feel and inhibits stickiness in the final product, thereby allowing for easy manipulation. The preferred coating is calcium carbonate. Other coatings include talc, alumina trihydrate, and titanium dioxide, as well as functional components such as pigments and dyes.

One preferred coated microsphere is sold under the tradename DUALITE™ M6001AE by Pierce & Stevens. M6001AE is an ultra-low density, resilient, polymeric microsphere coated with calcium carbonate. It is a lightweight filler that reduces density of the dough and occupies the volume not attributable to water and resin. The resilient polymeric microspheres are shear stable and impact resistant, thus remaining intact under formulation conditions. Other hollow composite microsphere fillers useful in the composition of the invention have densities ranging from 0.10 to 0.75 g/cc, and include the wettable particulate coatings discussed above.

Other workable microspheres are available in various sizes and densities. Ceramic microspheres range in diameter from 15 to 40 microns and have a density of about 0.7 g/cc. However, the ceramic microspheres give the dough a grainier texture and a brownish coloring. Silica alumina alloy microspheres range in diameter from 1 to 100 microns and have densities ranging from 2.1 to 2.5 g/cc, depending upon the wall thickness. Plastic microspheres made from a variety of materials are available in sizes ranging from 10 to 1000 micron diameter and densities ranging from 0.13 to 0.95 g/cc. Any of these materials, or combinations of such materials, may be employed for the purpose of achieving particular combinations of properties.

In addition to microspheres, other fillers may be used with the modeling doughs of the present invention. For example, polymeric fillers, having plate-like, fibrous, or other shapes may be used, as may nonpolymeric fillers. These materials may replace the microspheres in whole or in part. For example, KEVLAR an aramid pulp fiber available from E.I. du Pont de Nemours & Co., Wilmington, Del., and KAY-OCEL a family of cellulose fibers available from American Fillers and Abrasives, Inc., Bangor, Mich., may be used in the modeling doughs of the present invention. Alternatively, compounds such as mica, silicates, and clays may be used. Examples of suitable mica are those available from KMG Minerals, Inc., Kings Mountain, N.C. When used, the mica is preferably 325 mesh mica. Suitable silicates include sodium potassium aluminum silicate, available from Nord Perlite, Dayton, Ohio. Suitable clays include, for example, clays available from Southern Clay Products, Gonzales, Texas, under the names LAPONITE RDS and LAPOMER 40, and POLARGEL T, available from American Colloid Co., Arlington Heights, Ill. Although clay may be used as a filler in the modeling doughs of the present invention, the modeling doughs of the present invention preferably are formulated without clay. Wheat flour, available from ConAgra, Inc., Omaha, Nebr., may also be used as a filler, and may further act as a water-soluble polymeric resin.

Non-fibrous fillers may have a particle size ranging up to about 150 microns. Preferably, the fillers have a particle size less than about 50 microns. Fibrous fillers may have a size of about 30 microns to 0.5 mm depending on the desired texture of the finished product.

Also newly discovered is that waxes may be used in the modeling doughs of the present invention in conjunction with other fillers. Any compatible natural or synthetic wax may be used, including water-soluble waxes and non-water-soluble waxes. Non-water-soluble waxes are immiscible with water and are especially suitable as fillers.

Waxes, defined as those waxes that are solid at room temperature, can be powdered to add to the other solid ingredients during the preparation of the modeling dough. Preferably, DUALITE microspheres are used in conjunction with a wax when a wax is used. When used, the wax preferably has a molecular weight ranging from about 150 to about 4,000. Examples of suitable waxes include sodium stearate, such as that available from Witco Oleochemicals/ Surfactants Group, Houston, Tex.; AQUAWAX 114, a micronized wax available from Micro Powders, Inc., Tarrytown, N.Y.; DOW CORNING 290, available from Dow Corning, and those CARBOWAX polyethylene glycols available from Union Carbide that are solid at room temperature. Carbowaxes and other water-soluble, low molecular weight waxes that are liquid at room temperature may properly be classified as humectants.

The preferred composition of the modeling dough disclosed by the present invention incorporates any one or more of the following optional components: (1) a defoamer; (2) a wetting agent or dispersant; (3) a humectant; (4) a preservative; (5) a colorant; (6) a buffering agent; and (7) a scent or fragrance.

A defoamer is used to eliminate air bubbles upon mixing of the components. Such additives are readily available from numerous sources. The amount of defoamer is not critical, though such materials are typically used in amounts of from about 1 to 2% by weight. Balab Bubblebreaker 748, an aliphatic oil and surfactant mixture or any other of the commercially available defoamers are equally suitable.

The wetting agent promotes dispersion of the microspheres and of any particulate colorant during the mixing of the disclosed modeling dough, and such materials are well known. One preferred wetting agent is sold under the tradename NOPCOSPERSE 44 by Henkel, a nonionic polyelectrolyte. The preferred weight percent of wetting agent is from about 0 to about 2%.

The humectant is not an essential component, but it is preferably added to help plasticize the polymeric resin. Without the humectant, the disclosed modeling dough may be more brittle. If too much humectant is added, however, the surface of the dough may become tacky, and paint applied to the dried dough may not dry completely as a result of the moisture affinity of the dough. The preferred humectants are triglycerol and glycerin because they are superior plasticizers in this system and produce a dough with a smooth texture. Alternative, yet satisfactory, humectants are propylene glycols, liquid poly(ethylene glycols) (such as Carbowax 200) and diethylene glycol. The humectant may be present in an amount of from about 0 to about 20% by weight, and preferably about 5% to about 15% by weight. Where the polymeric resin is a poly(vinyl alcohol) having a level of hydrolysis of from about 40% to about 80%, the humectant preferably is present in an amount up to about 15% by weight.

A desirable additive that increases shelf-life is a preservative, and a wide variety of such materials are available commercially. One preferred preservative is Kathon LX1.5, a 1.5% solution of isothiazolines. Another preferred preservative is Nuosept 95. The preferred weight percent of preservative is from about 0.15% to about 0.75%.

A colorant further may be used in the modeling dough. If no colorant is used, the resulting dough generally is white. A white dough has many applications because it can be easily painted with water-based paints. Also, white is an attractive color in itself and has many applications without the need for painting. If a colored dough is desired, a variety of pigments and dyes may be used. Fluorescent doughs are especially attractive to children. Fluorescent pigments that work especially well include those sold under the trade names Aurora Pink Z- 11-3, Saturn Yellow Z-17N and Signal Green Z-18-3, by Day Glo Color Corp., Cleveland, Ohio. The colorant may be present in an amount up to about 15% by weight. Preferably, the colorant is present in an amount up to about 5% by weight.

A buffer may also be added to raise the pH in some formulations. The buffer comprises a buffering agent included with the aqueous phase of the modeling dough. When the pH is below 7.0, the polymeric resin may not gel properly, and pH levels above pH 7 are thus preferred. The pH of the modeling dough preferably ranges from about 8 to about 8.5 before drying. If boric acid is used as the gellant, the pH tends to drift and creates the need for a buffer. Also, formulations using low molecular weight, partially hydrolyzed polymeric resins are acidic and may require a buffer. However, one appropriate buffering agent is sodium tetraborate, which is also the preferred gellant.

A preferred buffering system contains tris(hydroxymethyl)aminomethane and HCl as the buffering agents. The buffer would therefore comprise tris(hydroxymethyl)aminomethane, 0.1M HCl, and water, as set forth in Example 14. Alternative buffering agents, when needed due to a pH below 7.0, include 2-amino-2-methyl- 1-propanol, such as AMP 95, sold by IMC Chemical Group, Inc., and sodium bicarbonate. The preferred amount of buffering agent is from about 0 to about 1% by weight of the total modeling dough composition, in addition to the gellant.

A scent may be added to the dough. The term "scent" is hereby defined to include any scent or fragrance suitable for use in the modeling doughs of the present invention. If a scent or fragrance is added, it is preferred to include a scent or fragrance that corresponds to the color of the dough. For example, orange-colored dough may include an orange fragrance. The dough may then be molded into the shape of an orange, and the resulting model will smell like an orange. Similarly, black dough may include a licorice scent or fragrance; purple dough may include a grape scent or fragrance, and so forth.

The particular choice of scent is not subject to any particular limitation. Oil-based scents may be used, although it is preferred to use water-based scents. Timed-release scents may be used where it is desired to retain the scent after the modeling dough has dried. Examples of suitable scents include: floral, foods, fruits, spices, and woods. For example, floral scent F- 340-F, WS, available from Shaw Mudge & Co., Stamford, Conn.; or artificial grape fragrance, available from International Flavors & Fragrances, Dayton, N.J., may be used. When used, the scent may be present in an amount ranging from about 0.05% to about 5% by weight. Preferably, the scent is present in an amount ranging from about 0.5% to about 1.0% by weight.

The following examples further illustrate the present invention but, of course, should not be construed as in any way limiting its scope. Percentages in the following examples are defined as percentages by weight.

EXAMPLE 1

This example illustrates a preferred modeling dough made with poly (vinyl alcohol).

The modeling dough is formulated in two steps. First, a poly(vinyl alcohol) premix is made. Second, this premix is blended with the remaining components.

|  | Percent |
|---|---|
| Premix |  |
| Deionized water | 57.41 |
| Glycerin | 24.80 |
| Poly(vinyl alcohol) | 14.17 |
| Defoamer |  |
| Balab Bubblebreaker 748 | 2.13 |
| Wetting Agent | 1.06 |

| | Percent |
|---|---|
| NOPCOSPERSE 44 Preservative | |
| KATHON LX1.5 | 0.10 |
| NUOSEPT 95 | 0.33 |
| Total | 100.00 |

| Modeling Dough | |
|---|---|
| Premix | 60.38 |
| Filler DUALITE microspheres | 25.58 |
| Deionized water | 13.76 |
| Gellant | 0.28 |
| Sodium Tetraborate | |
| Total | 100.00 |

EXAMPLE 2

This example illustrates the use of a filler other than plastic microspheres in the modeling dough of the present invention.

Example 1 is repeated, except that mica (325 mesh) is used as the filler. The dough thus is formulated as follows:

| Premix | Percent |
|---|---|
| Deionized water | 57.41 |
| Glycerin | 24.80 |
| Poly(vinyl alcohol) | 14.17 |
| Defoamer Balab Bubblebreaker 748 | 2.13 |
| Wetting Agent NOPCOSPERSE 44 Preservative | 1.06 |
| KATHON LX1.5 | 0.10 |
| NUOSEPT 95 | 0.33 |
| Total | 100.00 |

| Modeling Dough | Percent |
|---|---|
| Premix | 60.38 |
| Filler mica | 25.58 |
| Deionized water | 13.76 |
| Gellant | 0.28 |
| Sodium Tetraborate | |
| Total | 100.00 |

EXAMPLE 3

Example 3 illustrates the use of a wax in combination with plastic microspheres as a filler in the modeling dough of the present invention.

| Component | Percent |
|---|---|
| Airvol 107 (20 percent aqueous solution) | 61.95 |
| Glycerin Preservative | 2.00 |
| NUOSEPT 95 | 0.20 |
| KATHON LX1.5 | 0.15 |
| Wax | 2.00 |

| Component | Percent |
|---|---|
| Aquawax 114 | |
| Calcium carbonate | 2.00 |
| Filler | 2.00 |
| DUALITE 6001AE microspheres | |
| 2 percent aqueous borate solution | 29.70 |
| Total | 100.00 |

The dough of Example 3 was prepared by blending the foregoing ingredients. The dough exhibited satisfactory extrusion properties and was cuttable with a cookie cutter.

EXAMPLES 4–6

These examples illustrate the use of a wax in combination with plastic microspheres as a filler. Further, these examples illustrate the process of preparation of the modeling doughs of the present invention.

| Component | Example 4 | Example 5 | Example 6 |
|---|---|---|---|
| | | Percent | |
| Deionized water | 47.9 | 47.5 | 46.8 |
| Resin AIRVOL 523 | 8.5 | 8.5 | 8.5 |
| Glycerin | 14.4 | 14.4 | 14.4 |
| Defoamer Balab Bubblebreaker | 2.1 | 2.1 | 2.1 |
| Wetting Agent NOPCOSPERSE 44 Preservative | 0.6 | 0.6 | 0.6 |
| KATHON LX15 | 0.15 | 0.15 | 0.15 |
| NUOSEPT 95 | 0.2 | 0.2 | 0.2 |
| Filler DUALITE 6001 AE | 25.6 | 25.6 | 25.6 |
| Borate solution (2%) | 0.28 | 0.28 | 0.28 |
| Wax Dow Corning 290 | 0.28 | 0.69 | 1.38 |
| Total | 100.0 | 100.0 | 100.0 |

The modeling doughs of Examples 4–6 were prepared by first blending the deionized water, AIRVOL 523, glycerin, Balab Bubblebreaker, NOPCOSPERSE 44, and KATHON LX15 to form a premix. After this premix was formed, additional deionized water was added, and the remaining ingredients incorporated into the blend to form a modeling dough.

All of the doughs of Examples 4–6 were satisfactory modeling doughs.

EXAMPLES 7–8

Examples 7 and 8 illustrate the use of sodium stearate, a wax, in the modeling doughs of the present invention. The polyvinyl premix wax a mixture. of 14.2% AIRVOL 523, 57.3% water, and 24.8% glycerin.

| Component | Example 7 | Example 8 |
|---|---|---|
| | Percent | |
| Polyvinyl alcohol premix | 60.40 | 60.40 |
| DUALITE 6001AE | 23.56 | 21.56 |
| Borate solution (2%) | 0.28 | 0.28 |
| Deionized water | 13.76 | 13.76 |

| Component | Example 7 Percent | Example 8 Percent |
|---|---|---|
| Sodium stearate | 2.00 | 4.00 |
| Total | 100.00 | 100.00 |

EXAMPLE 9

Example 9 illustrates the use of a polymeric resin other than unmodified poly(vinyl alcohol) in the modeling doughs of the present invention.

| Component | Percent |
|---|---|
| Aqueous PVA/wheat flour solution (17.5% Elvanol 75-15, 15% wheat flour) | 77.7 |
| Glycerin | 2.1 |
| 2% borate solution | 20.2 |
| Total | 100.00 |

The dough of Example 9 was sticky, but otherwise acceptable as a modeling dough. The wheat flour in this example serves as a filler rather than as a polymeric resin.

EXAMPLE 10

Example 10 illustrates the use of a plastic filler other than plastic microspheres. In addition, Example 10 illustrates the use of a polymeric resin other than poly(vinyl alcohol) in the modeling doughs of the present invention.

| Component | Percent |
|---|---|
| Aqueous solution (10% ELVANOL 52-22, 10% AMAIZO 710) | 73.3 |
| Glycerin | 3.0 |
| Preservative | |
| NUOSEPT 95 | 0.25 |
| KATHON LX 1.5 percent | 0.15 |
| Filler KAYOCEL 2W100 | 7.0 |
| 2% borate solution | 16.3 |
| Total | 100.00 |

The dough prepared according to Example 10 was stiff, but otherwise satisfactory as a modeling dough.

EXAMPLE 11

Example 11 illustrates the use of a polymeric resin other than poly(vinyl alcohol) in the modeling doughs of the present invention.

The modeling dough of Example 1 is prepared using GAF PVP K-15 as the polymeric resin.

EXAMPLE 12–13

These examples illustrate the use of a scent in the modeling doughs of the present invention.

| Components | Example 12 Percent | Example 13 Percent |
|---|---|---|
| DUALITE 6001 AE | 26.0 | 26.0 |
| Premix | 60.3 | 60.45 |
| DI Water | 13.0 | 13.0 |
| Sodium Tetraborate | 0.31 | 0.31 |
| Fragrance | 0.5 | 0.25 |
| water-soluble blueberry fragrance | 100.0 | 100.0 |

The polyvinyl premix was a mixture of 14.2% AIRVOL 523, 57.3% water, and 24.8% glycerin. The blueberry fragrance is that available from Thornley Chemical, Wilmington, Del.

EXAMPLE 14

This example illustrates the use of a buffer in the preparation of the modeling dough. It also illustrates the use of two polyvinyl alcohols.

The buffer of example 14 comprises 60.57 grams of tris(hydroxymethyl)aminomethane, 57.0 ml of 0.1M HCl, and 943.0 ml of deionized water.

| Modeling Dough | |
|---|---|
| Component | Amount (g) |
| ELVANOL 93-01 | 23.96 |
| AIRVOL 125 | 1.20 |
| Buffer | 81.49 |
| Glycerine | 7.20 |
| NOPCOSPERSE 44 | 1.55 |
| BALAB 748 | 3.24 |
| Preservative | |
| KATHON LX 1.5 | 0.12 |
| NUOSEPT 95 | 0.40 |
| AMP 95% | 0.96 |
| Filler | |
| Dualite 6001AE | 48.0 |
| Water | 26.0 |

While particular embodiments of the invention have been shown, it will of course be understood that the invention is not limited thereto since modifications may be made by those skilled in the art, particularly in light of the foregoing teachings. It is, therefore, contemplated by the appended claims to cover any such modifications as incorporate those features which constitute the essential features of these improvements within the true spirit and scope of the invention. All references and previous applications cited herein are hereby incorporated by reference in their entireties.

What is claimed is:

1. A moldable modeling dough composition comprising a polar polymeric resin, water, a gellant, and a filler, wherein said polar polymeric resin is selected from the group consisting of fully hydrolyzed copolymers of vinyl alcohol and methacrylic acid and fully hydrolyzed copolymers of vinyl alcohol and acrylic acid.

2. A moldable modeling dough composition according to claim 1, wherein said filler comprises a wax.

3. A moldable modeling dough composition according to claim 1, comprising from about 40% to about 60% by weight water, from about 4% to about 15% by weight total polymeric resin, from about 0.5% to about 30% by weight filler, and from about 0.2% to about 2% by weight gellant.

4. A moldable modeling dough composition according to claim 3, comprising from about 43% to 49% by weight water, from about 10% to about 14% by weight total polymeric resin, from about 24% to about 26% by weight filler, and from about 0.05% to about 0.2% by weight gellant.

5. A moldable modeling dough composition according to claim 4, further comprising a humectant.

6. A moldable modeling dough composition according to claim 4, further comprising a buffering agent.

7. A moldable modeling dough composition according to claim 1, further comprising a scent.

8. A moldable modeling dough composition according to claim 1, further comprising [ a buffering agent.

9. A moldable modeling dough composition according to claim 1, wherein said filler is selected from the group consisting of plastic microspheres, aramid pulp fibers, cellulose fibers, talc, calcium carbonate, mica, clays, silicates, and mixtures thereof.

10. A moldable modeling dough composition according to claim 9, wherein said filler further comprises a wax.

11. A moldable modeling dough composition according to claim 9, further comprising a scent.

12. A moldable modeling dough composition according to claim 1, wherein said filler comprises plastic microspheres.

13. A moldable modeling dough composition according to claim 12, wherein said microspheres have a wettable particulate coating.

14. A moldable modeling dough composition according to claim 5, wherein said humectant is present in an amount of from about 5% to about 15% by weight.

15. A moldable modeling dough composition according to claim 6, wherein said buffering agent is present in an amount of up to about 1% by weight.

16. A moldable modeling dough composition according to claim 8, wherein said buffering agent is present in an amount of up to about 1% by weight.

* * * * *

UNITED STATES PATENT AND TRADEMARK OFFICE
CERTIFICATE OF CORRECTION

PATENT NO.   :   5,498,645
DATED        :   March 12, 1996
INVENTOR(S)  :   Mariano et al.

It is certified that errors appear in the above-identified patent and that said Letters Patent is hereby corrected as shown below:

On the Title Page item

[56] References Cited, line 13: "Ficher" should read --Fichera--

[56] Foreign Patent Documents: add:

SU-617,409      12/1975     Russia

DE-3,042,850    11/1979     Germany

In the Claims:

Column 13, line 14: "[a" should read --a--

Signed and Sealed this

Nineteenth Day of January, 1999

Attest:

Attesting Officer

*Acting Commissioner of Patents and Trademarks*